(12) United States Patent
Anderson et al.

(10) Patent No.: US 7,995,485 B1
(45) Date of Patent: Aug. 9, 2011

(54) METHOD AND APPARATUS FOR PROVIDING AUTOMATED DIAGNOSTICS OF NETWORKS

(75) Inventors: Thomas Anderson, Imperial, MO (US);
Paritosh Bajpay, Edison, NJ (US);
Roberta Bienfait, Norcross, GA (US);
Mojgan Dardashti, Holmdel, NJ (US);
Mark Hunt, Plano, TX (US); Jackson Liu, Middletown, NJ (US); Zhiqiang Qian, Holmdel, NJ (US); Michael John Zinnikas, North Brunswick, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 455 days.

(21) Appl. No.: 11/618,891

(22) Filed: Dec. 31, 2006

(51) Int. Cl.
*H04J 1/16* (2006.01)

(52) U.S. Cl. ........ 370/242; 370/252; 370/216; 725/105; 709/232

(58) Field of Classification Search .................. 370/252, 370/253, 241, 216; 714/4, 25, 37, 39, 42, 714/43, 47; 709/223, 224, 232; 725/105, 100, 106, 109, 111, 116, 120
See application file for complete search history.

(56) References Cited

U.S. PATENT DOCUMENTS

| | | | |
|---|---|---|---|
| 6,430,150 B1 * | 8/2002 | Azuma et al. | 370/218 |
| 6,788,765 B1 * | 9/2004 | Beamon | 379/27.01 |
| 7,032,016 B2 | 4/2006 | Cerami et al. | |
| 7,817,570 B1 | 10/2010 | Anderson et al. | |
| 2002/0073355 A1 * | 6/2002 | Cerami et al. | 714/4 |
| 2002/0078017 A1 * | 6/2002 | Cerami et al. | 707/1 |
| 2002/0087680 A1 | 7/2002 | Cerami et al. | |
| 2003/0149919 A1 * | 8/2003 | Greenwald et al. | 714/43 |
| 2005/0183129 A1 * | 8/2005 | Cerami et al. | 725/105 |
| 2006/0015917 A1 * | 1/2006 | Rozental | 725/111 |

* cited by examiner

*Primary Examiner* — Huy D Vu
*Assistant Examiner* — Dady Chery (57) ABSTRACT

A method and system for providing automated diagnostics of networks using multiple physical channels are disclosed. For example, the method receives a ticket indicating a problem and attempts to identify at least one physical channel of the network that is a potential cause of the problem. The method runs at least one diagnostic test on the identified physical channel and reports a result of said diagnostic test.

14 Claims, 5 Drawing Sheets

METHOD AND APPARATUS FOR PROVIDING AUTOMATED DIAGNOSTICS OF NETWORKS

The present invention relates generally to communication networks and, more particularly, to a method and apparatus for providing automated processing of trouble tickets on packet networks.

BACKGROUND OF THE INVENTION

Networks, such as for example, IP networks and Synchronous Optical Networks (SONET), provide network architecture for high speed data transmissions. Current network architecture may comprise a vast number of components, connections, logical channels and physical lines located around the globe that carry data from endpoint to endpoint.

An individual or an enterprise customer may subscribe for services over the network. For example, an enterprise customer may subscribe to a network using multiple physical channels. For example, multi-link point-to-point protocol (MLPPP) may be used to transmit data over a single logical channel having multiple physical channels. MLPPP provides a protocol that provides efficient use of multiple physical channels connected between two devices.

Occasionally, a customers may report problems on the network affecting their service. Currently, when a problem is reported, troubleshooting the problem is performed manually by technicians. However, as discussed above, due to the vast size of the network architecture, manually troubleshooting the root cause of the problem by technicians may be extremely time consuming or expensive. Moreover, in network architectures using multiple physical channels, identifying which physical channel has a problem may be difficult because there is no unique address associated with each physical channel (That is, all physical channels within a bundle share one same IP Address). Consequently, service to the customer may be affected due to the network being down or degraded for an extended period of time, thereby creating costumer dissatisfactions. In turn, the extended periods of down time to the network may have an impact on the revenue of a network service provider.

Therefore, there is a need for a method that provides automated diagnostics of IP networks using multiple physical channels.

SUMMARY OF THE INVENTION

In one embodiment, the present invention provides a method and system for providing automated diagnostics of networks using multiple physical channels. For example, the method receives a ticket indicating a problem and attempts to identify at least one physical channel of the network that is a potential cause of the problem. The method runs at least one diagnostic test on the identified physical channel and reports a result of said diagnostic test.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

It is to be noted, however, that the appended drawings illustrate only exemplary embodiments of this invention and are therefore not to be considered limiting of its scope, for the invention may admit to other equally effective embodiments.

DETAILED DESCRIPTION

Figure 1:
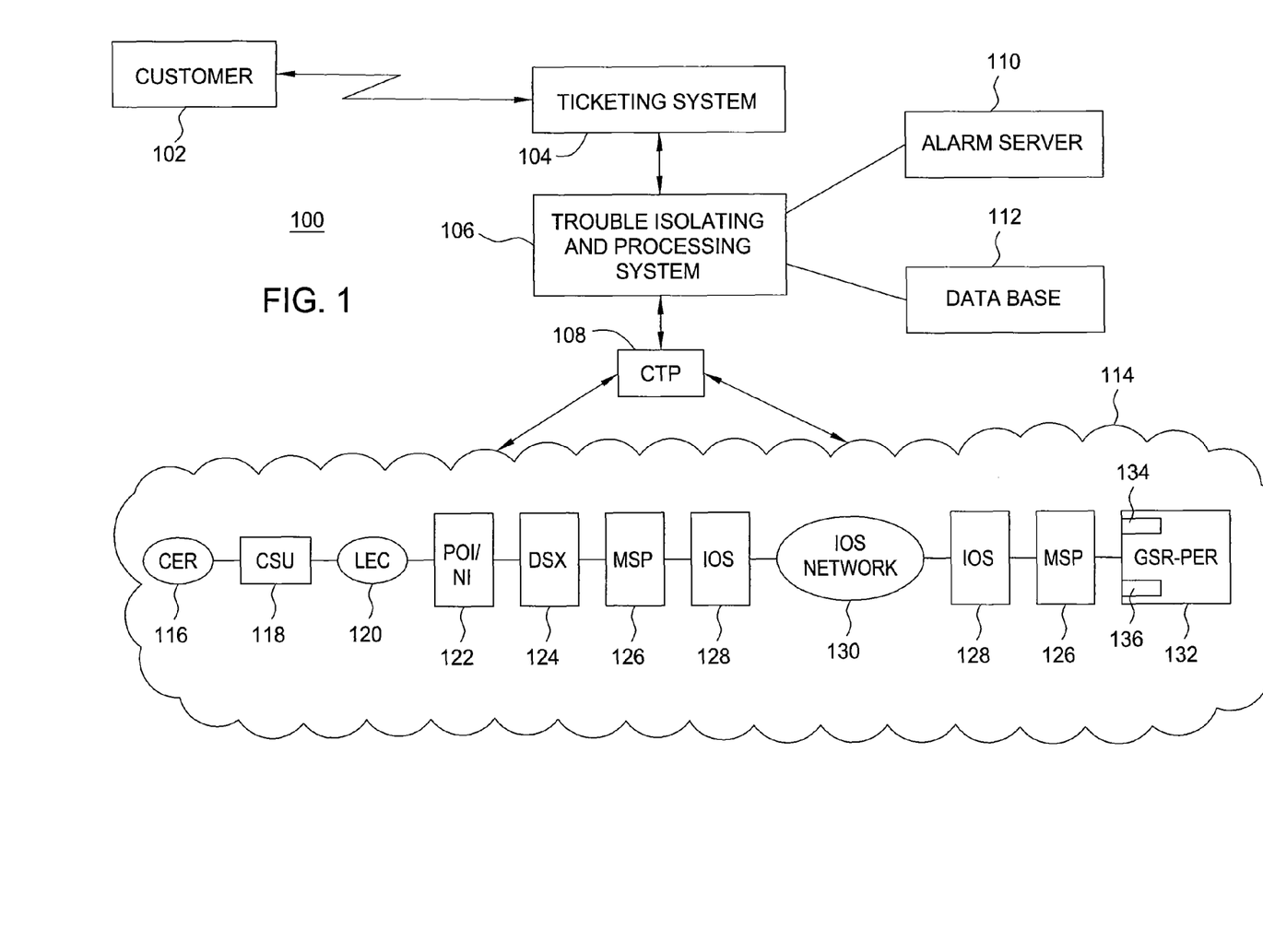
FIG. 1 depicts a high-level block diagram of an exemplary architecture for providing automated diagnostics of networks using multiple physical channels according to one embodiment of the present invention.

FIG. 1 depicts a high-level block diagram of an exemplary system 100 for providing automated diagnostics of networks using multiple physical channels according to one embodiment of the present invention. In one embodiment, the system 100 may comprise a ticketing system 104, an automated diagnostics system (e.g., a trouble isolating and processing system) 106, a common testing platform (CTP) 108, alarm server 110, database 112 and a network 114 (e.g., a layer 1 network and a layer 2 network). In operation, a customer 102 may contact the ticketing system 104 to report a problem with its service. In an exemplary embodiment, the ticketing system 104 may include an interactive voice response (IVR) module to receive a reported problem from the customer 102.

In an exemplary embodiment, a ticket is generated in response to the problem reported by the customer 102. The generated ticket may be forwarded to the automated diagnostics system 106. In an exemplary embodiment, automated diagnostics system 106 may control all of the test scripts that are executed by the CTP 108. For example, automated diagnostics system 106 controls which test scripts are to be executed for testing each component in the network 114.

Automated diagnostics system 106 may also have access to database 112 and alarm server 110. One skilled in the art will recognize that there may be one or more alarm servers 110. Similarly, one skilled in the art will recognize that there may be one or more databases 112. Alarm server 110 is capable of automatically detecting or simply reporting one or more alarms associated with the components shown in network 114. Database 112 may store previously reported alarms, test scripts that are used to test the components of network 114, and/or configuration information associated with the components of network 114. Database 112, may also store any other information required by automated diagnostics system 106 to perform the methods described herein.

FIG. 1 illustrates the CTP 108 being generally connected to network 114. In an exemplary embodiment, network 114 may be any network for providing high speed data transmission such as, for example, a native IP point-to-point network (e.g., layer 2 network) and/or a Synchronous Optical Network (SONET) (e.g., layer 1 network). In an exemplary embodiment, network 114 may utilize MLPPP. However, the present invention may apply to any network using any type of protocol to transmit data over a logical channel having multiple physical channels. MLPPP may be used in networks where a single logical channel between two devices may actually contain many physical channels, e.g., T1 transmission lines.

Although the logical channel is identified by an Internet Protocol (IP) address, physical channels cannot be so easily identified because they are not associated with any particular address.

In an exemplary embodiment, CTP 108 is connected to network 114 at multiple testing points. By being connected at multiple testing points, CTP 108 is able to better isolate the root cause of problems detected in network 114. Connections to multiple testing points provide CTP 108 the capability to execute test script logic or test scripts on any layer, for example, from layer 1 to layer 2 of network 114.

In an exemplary embodiment, network 114 may comprise various elements spanning from a customer edge router (CER) 116 to a gigabit switch router (GSR) at the provider edge router (PER) 132. The GSR PER may also comprise a working card 134 and a protection card 136 (e.g., a redundant card for working card 134 to failover to).

As illustrated by the example in FIG. 1, CER 116 is connected to a channel service unit (CSU) 118. Loop testing may be performed between the CSU 118 and PER 132, as discussed below, to determine, for example, if the reported problem is at the customer's location. The loop test may be an example of one of the many tests that can be executed by CTP 108.

CSU 118 is connected to a local exchange carrier (LEC) access network 120, which is operated by a local access network provider. LEC 120 may then be connected to a point of interface/network interface (POI/NI) 122. This is often the edge of a core network. Subsequently, the POI/NI 122 is connected to a digital cross connect (DSX) 124. In turn, the DSX 124 is then connected to a multi server platform (MSP) 126.

In one embodiment, the MSP 126 is used for converting data from layer 1 to layer 2 of the present network 114. In an exemplary embodiment where SONET is used, MSP 126 is connected to an intelligent optical switch (IOS) 128. IOS 128 is connected to an IOS network 130, for example, a SONET network. IOS network 130 represents, for example, a layer 1 network. IOS network 130 is connected to another IOS 128, which, in turn, is connected to another MSP 126. Finally, MSP 126 is connected to the GSR PER 132.

In one embodiment, customer 102 may subscribe to services over network 114. In an exemplary embodiment, network 114 uses MLPPP to transmit data over a single logical channel having multiple physical channels. As discussed above, networks using MLPPP may have one logical channel that is identified via an IP address. However, that said logical channel may actually comprise a plurality of physical channels. For example, a logical channel using T1 transmission lines may contain up to eight (8) T1 lines. However, these physical channels do not possess their own IP address similar to the logical channel. Therefore, identifying problems on the physical channels is much more difficult. In one embodiment, the present invention provides a method for automating the processing of a ticket to identify a problem associated with one or more physical channels.

Figure 2:
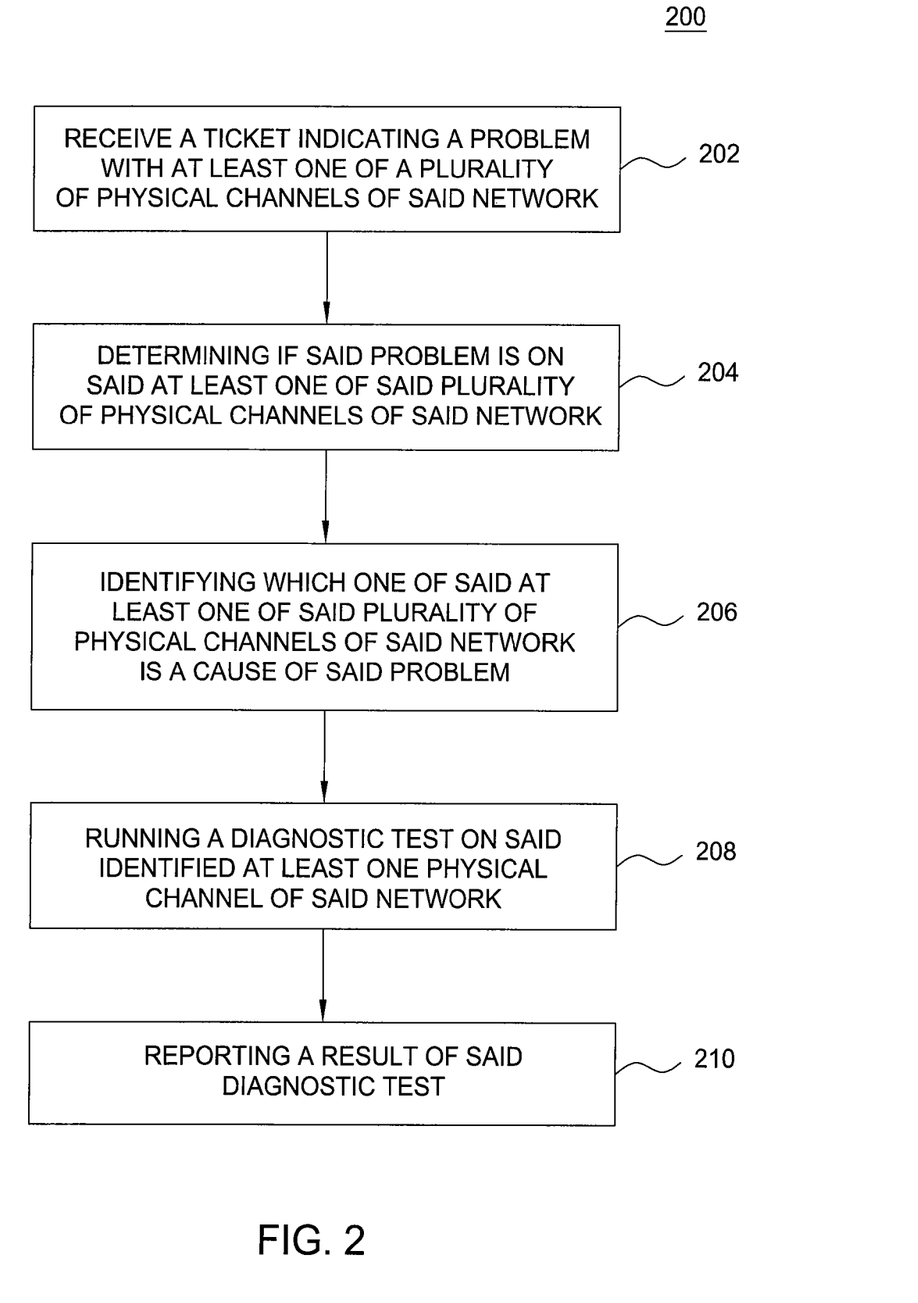
FIG. 2 depicts a flow diagram of a method for providing automated diagnostics of networks using multiple physical channels according to one embodiment of the present invention.

FIG. 2 depicts a flow diagram of a method 200 for providing automated diagnostics of networks using multiple physical channels according to one embodiment of the present invention. For better understanding of the present invention, the reader should simultaneously refer to FIGS. 1 and 2.

The method 200 starts at step 202 where a ticket is received indicating a potential problem with at least one of a plurality of physical channels of the network. As discussed above, in IP networks for example, there may be at least one logical channel with an IP address. However, the at least one logical channel may have multiple physical channels that share one IP address with the said logical channel. Therefore, trying to identify which physical channel is down, degraded or experiencing a problem may be very difficult and time consuming if performed manually.

At step 204, method 200 determines if the problem is associated with at least one of the plurality of physical channels of the network 114. For example, method 200 may execute various test scripts, discussed below, to determine if the problem is associated with at least one of the plurality of physical channels of the network 114.

At step 206, if method 200 determines that the problem is associated with at least one of the plurality of physical channels of the network 114, then method 200 may identify which one of the plurality of physical channels of the network 114 is a source (e.g., a potential cause) of the problem. In other words, method 200 executes one or more test scripts to determine how many and which physical channels are experiencing a problem. In one embodiment, method 200 determines that the problem is associated with multiple physical channels. If the problem is associated with multiple physical channels, then method 200 may simply generate a report indicating that the problem is impacting multiple physical channels without performing any additional testing. Such report will be sent to a system indicating that additional actions must be promptly taken to resolve the ticket. Namely, a problem impacting multiple physical channels is often an indication of a significant failure event.

At step 208, method 200 executes one or more diagnostic test scripts, e.g., a complete automated test (CAT) suite, that are designed to troubleshoot problems associated with a physical channel of the network 114. The diagnostic test scripts may assist in determining what problems are occurring on the physical channel and where in the network 114 the problem is occurring on the identified physical channel.

At step 210, method 200 reports the results of the diagnostic test scripts. In one embodiment, method 200 may report the results of the diagnostic test scripts in various ways. For example, method 200 may simply log the results of the diagnostic test scripts in a database, such as database 112. In an alternative embodiment, method 200 may report the results such that the ticket is moved to a reporting system indicating that additional actions must be promptly taken to resolve the ticket, i.e., the ticket must receive immediate action by a service technician. In another embodiment, method 200 may report the results such that the ticket is moved to a reporting system where a work order is to be generated. In another embodiment, method 200 may report the results such that the ticket is moved to a reporting system where a third party, e.g., the LEC 120, or the customer is notified. Thus, method 200 provides an efficient network troubleshooting approach, thereby reducing costs and expediting the proper processing of tickets.

Figure 3:
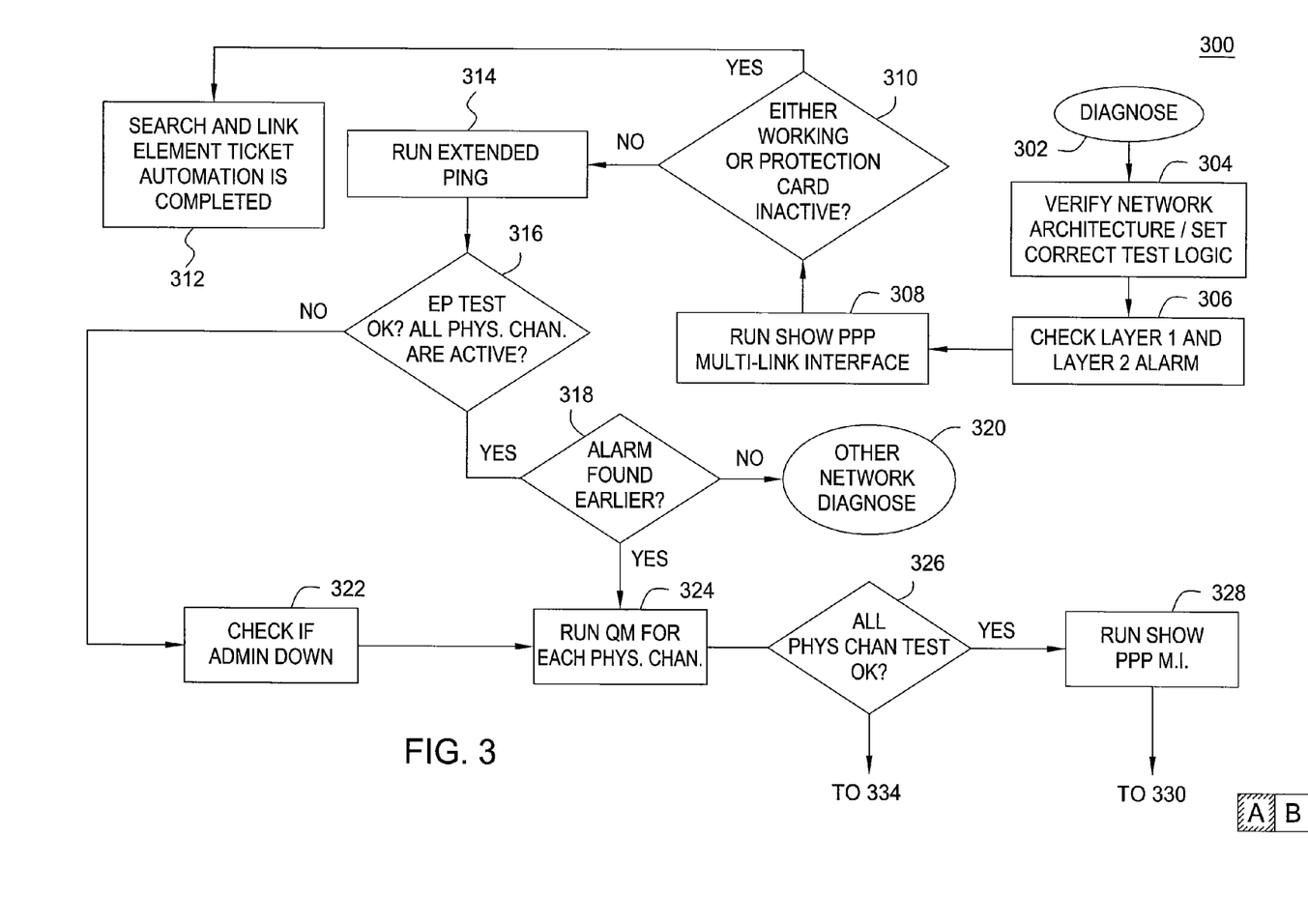
FIG. 3 depicts a more detailed flow diagram of a method for providing automated diagnostics of networks using multiple physical channels according to one embodiment of the present invention.

FIG. 3 depicts a more detailed flow diagram of a method 300 for providing automated diagnostics of networks using multiple physical channels according to one embodiment of the present invention. Similar to FIG. 2, for better understanding of the invention, the reader should simultaneously refer to FIGS. 1 and 3.

In an exemplary embodiment, method 300 begins at step 302 where a problem ticket is received and a diagnosis is initiated. Subsequently, at step 304, method 300 verifies the network architecture that is associated with the problem ticket. For example, unique test scripts are written for specific types of network architecture and the various components that are deployed in the network architecture. In one embodiment of the present invention, test scripts used in method 300 may be applicable to IP networks or SONET networks. However, method 300 may be adapted to apply to other network architectures using other test scripts. After the network architecture originating the problem ticket is verified, the correct test script logic is set.

At step 306, method 300 checks for alarms in network 114 that are associated with the current ticket. For example, method 300 may look for alarms in specific layers of network 114 such as, for example, layer 1 and/or layer 2, e.g., alarms generated or reported by the alarm server 110 for network 114. Method 300 may store any information found on alarms generated by network 114 for later use.

At step 308, a test script "Show PPP Multi-Link Interface" is executed. For example, "Show PPP Muli-Link Interface" is a test script that determines a status of each physical channel within a logical channel of network 114. "Show PPP Muli-Link Interface" may test the CER 116 to GSR PER 132 at layer 2 of the network 114. As discussed above, each logical channel may have multiple physical channels that are difficult to identify. In an exemplary embodiment, "Show PPP Muli-Link Interface" may assign an identifier, such as a number for example, to each physical channel and returns the status of each physical channel.

At step 310, method 300 may optionally determine if both the working card 134 and the protection card 136 are inactive. For example, in one embodiment the GSR-PER may employ one or more redundant cards or protection cards to ensure reliability. If both the working card 134 and the protection card 136 are inactive, then method 300 proceeds to step 312 where the automated diagnostics is completed and the problem is attributed to the failure of the working card 134 to properly failover to the protection card 136. In other words, if the working card 134 suffers a catastrophic failure, it should properly failover to the protection card 136 which will then take over all the functions performed by the working card. Thus, the ticket received at step 302 may then be linked to this failover problem. It should be noted that if redundant cards are not deployed at the GSR-PER, then steps 310 and 312 are omitted.

However, if either working card 134 or protection card 136 is active, then method 300 proceeds to step 314 where another test script is executed. At step 314, test script "Extended Ping" is executed. In an exemplary embodiment, "Extended Ping" determines if there is an unacceptable delay in the physical channels. For example, a large delay may be an indication of a problem or a degradation on a particular physical channel. A large delay may be pre-defined to be over a certain period of time such as, for example over 80-90 milliseconds.

At step 316, based on the test script executed at steps 308 and 314, method 300 determines if all the physical channels are active. If all the physical channels are active, then the method 300 proceeds to step 318. If at least one of the physical channels is not active, then method 300 proceeds to step 322.

At step 318, method 300 determines if an alarm was found earlier at step 306. If no alarm was found earlier at step 306, method 300 proceeds to step 320 where other network diagnostics may be required, e.g., test scripts that operate to trouble problems at higher layers. However, at step 318, if an alarm was found earlier at step 306, then method 300 proceeds to step 324.

At step 322, method 300 checks if there was an "Admin Down" situation. An "Admin Down" situation indicates that one or more physical channels were taken down intentionally by the network service provider. If an "Admin Down" situation is detected, a "NoShut" test script is executed at step 322 to bring the physical channel back up to an active state. Then method 300 proceeds to step 324.

At step 324, method 300 executes a "Quick Monitor" test script to try to identify which physical channel is inactive and may be experiencing a problem. In an exemplary embodiment, the "Quick Monitor" test script monitors all the testing points of the network 114. For example, CTP 108 may establish a plurality of testing points in network 114. The testing points may be strategically selected, depending on the network architecture, to maximize the probability of finding which physical channel may have a problem and the location of the problem along the physical channel.

At step 326, method 300 determines if all physical channels are operating normally based on the "Quick Monitor" test script. If all physical channels are not operating normally, method 300 proceeds to step 334. If all physical channels are operating normally, method 300 proceeds to step 328 where "Show PPP Muli-Link Interface" test script is executed again. "Show PPP Muli-Link Interface" test script is executed again to determine if the problem is an intermittent problem.

At step 330, method 300 determines if all physical channels are active. If all physical channels are still active, then method 300 proceeds to step 332 where the alarm is logged and the ticket is moved to a reporting system (e.g., labeled as ACT) where the ticket requires immediate action. If at least one physical channel is not active, then method 300 proceeds to step 334.

At step 334, method 300 determines if a problem is detected on multiple physical channels. If a problem is detected on multiple physical channels, method 300 proceeds to step 356 where the problems are logged and identified as impacting multiple physical channels and the ticket is moved to a reporting system for immediate action and/or a notification is sent to the LEC 120. If a problem is not detected on multiple physical channels, method 300 proceeds to step 336.

At step 336, method 300 determines if the identified physical channel with a problem is the same physical channel reported on the ticket received at step 302. If the identified physical channel does match the physical channel on the ticket received at step 302, then the method 300 proceeds to step 344. If the identified physical channel does not match the physical channel on the ticket received at step 302, then the method 300 proceeds to step 338.

At step 338, method 300 checks to see if an alarm was found earlier at step 306. If an alarm was found earlier on the reported physical channel, then method 300 proceeds to step 340, where the alarm is logged and the ticket is moved to a reporting system where the ticket will require immediate action. However, if no alarm was found earlier, then method 300 proceeds to step 342 where method 300 logs the fact that trouble was found on a different physical channel than the physical channel reported on the ticket received at step 302 and the ticket is updated to report the problem on the newly identified physical channel.

At step 344, method 300 determines if an intrusive test is authorized. An intrusive test may be, for example, a loop test. However, the loop test is an intrusive test because the test will shut down the physical channel used by customer 102. If an intrusive test is not authorized, then method 300 proceeds to step 350, where method 300 logs the problem on the identified physical channel and moves the ticket to a reporting system where the ticket will require immediate action. If an intrusive test is authorized, then method 300 proceeds to step 346.

At step 346, method 300 determines if the problem is related to a public physical channel. If the problem is related to a private physical channel, then method 300 proceeds directly to step 352. However, if the problem is related to a public physical channel, method 300 proceeds to step 348.

At step 348, a test script is executed to shut down the physical channel, via CTP 108. Namely, an intrusive test on a public physical channel may affect a large number of customers instead of a single customer. As a result, the physical channel is shut down to provide proper notification.

At step 352, one or more diagnostic tests are executed on the physical channel. For example, the diagnostic tests may be a complete automated test (CAT) suite. After the diagnostic tests at step 352 are completed, method 300 proceeds to step 354, where method 300 reports results of the diagnostic tests. As discussed above, method 300 may report the results of the diagnostic test in various ways as discussed in step 210 of FIG. 2. For example, method 300 may simply log the results of the diagnostic test scripts in a ticketing system, such as Ticketing system 104. In an alternative embodiment, method 300 may report the results such that the ticket is moved to a reporting system indicating that additional actions must be promptly taken to resolve the ticket, i.e., the ticket must receive immediate action by a service technician. In another embodiment, method 300 may report the results such that the ticket is moved to a reporting system where a work order is to be generated. In another embodiment, method 300 may report the results such that the ticket is moved to a reporting system where a third party, e.g., the LEC 120, or the customer is notified.

Figure 4:
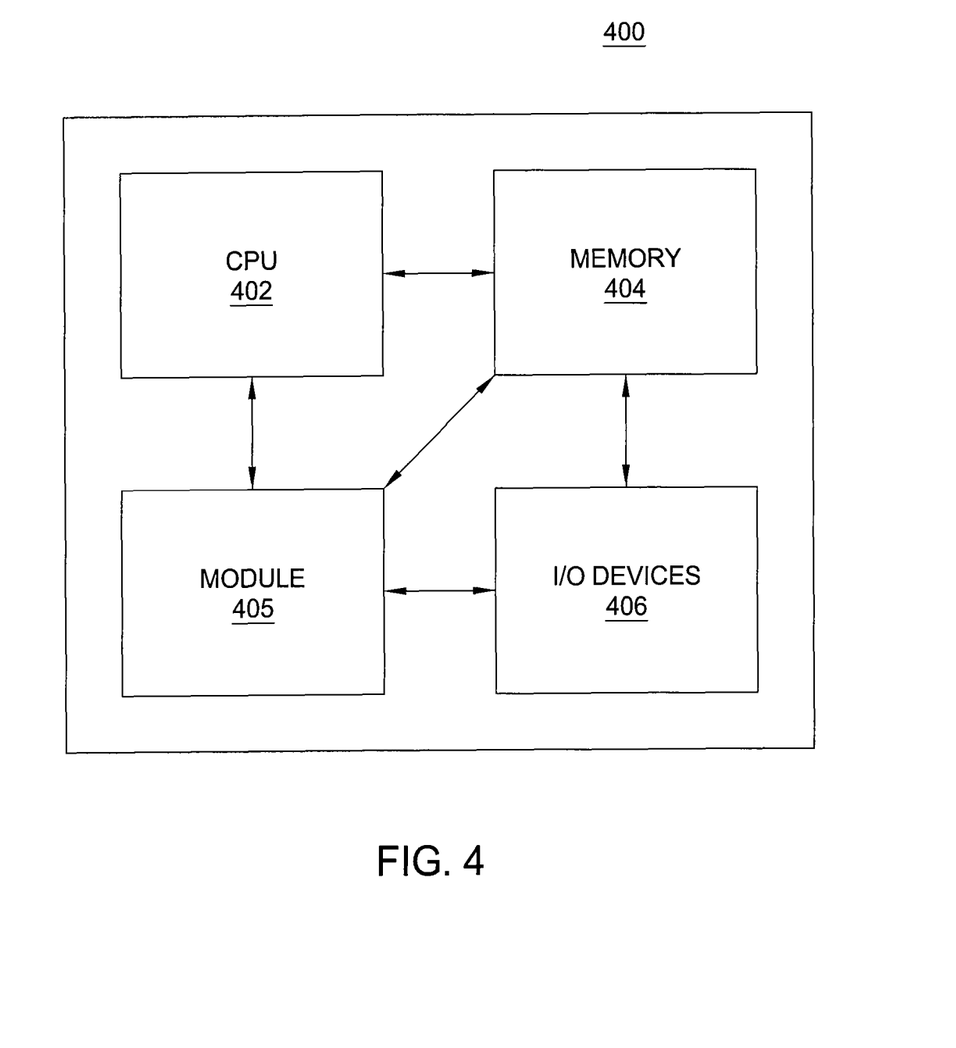
FIG. 4 illustrates a high level block diagram of a general purpose computer suitable for use in performing the functions described herein.

FIG. 4 depicts a high level block diagram of a general purpose computer suitable for use in performing the functions described herein. As depicted in FIG. 4, the system 400 comprises a processor element 402 (e.g., a CPU), a memory 404, e.g., random access memory (RAM) and/or read only memory (ROM), a module 405 for providing automated network diagnostics, and various input/output devices 406 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present module or process 405 for providing automated network diagnostics can be loaded into memory 404 and executed by processor 402 to implement the functions as discussed above. As such, the present method for providing automated network diagnostics 405 (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

The invention claimed is:

1. A method for automatically diagnosing a problem in a network having a plurality of physical channels, comprising:
   receiving a ticket indicating the problem for a logical channel, wherein the plurality of physical channels is grouped into the logical channel;
   identifying a physical channel of the plurality of physical channels of the network that is a potential cause of the problem;
   running a diagnostic test on the physical channel that is identified;
   reporting a result of the diagnostic test;
   comparing the physical channel that is identified with a reported physical channel in the ticket;
   checking for a recorded alarm associated with the reported physical channel in the ticket;
   logging an alarm if the recorded alarm is associated with the reported physical channel; and
   changing a circuit identification in the ticket if there is no recorded alarm associated with the reported physical channel.

2. The method of claim 1, further comprising:
   verifying the network is compatible with the diagnostic test.

3. The method of claim 1, further comprising:
   determining if a working card and a protection card deployed in a provider edge router of the network are inactive.

4. The method of claim 1, wherein the identifying comprises:
   running a test script that determines a status of each of the plurality of physical channels; and
   running an extended ping test script on each of the plurality of physical channels.

5. The method of claim 4, wherein the identifying further comprises:
   running a quick monitor test script for each of the plurality of physical channels; and
   determining if the problem is associated with more than one of the plurality of physical channels.

6. The method of claim 1, wherein the quick monitor test script tests a plurality of predefined test points in the network.

7. The method of claim 1, wherein the reporting comprises notifying a party impacted by the problem.

8. A non-transitory computer-readable medium having stored thereon a plurality of instructions, the plurality of instructions including instructions which, when executed by a processor, cause the processor to perform a method for automatically diagnosing a problem in a network having a plurality of physical channels, comprising:
   receiving a ticket indicating the problem for a logical channel, wherein the plurality of physical channels is grouped into the logical channel;
   identifying a physical channel of the plurality of physical channels of the network that is a potential cause of the problem;
   running a diagnostic test on the physical channel that is identified;
   reporting a result of the diagnostic test;
   comparing the physical channel that is identified with a reported physical channel in the ticket;
   checking for a recorded alarm associated with the reported physical channel in the ticket;
   logging an alarm if the recorded alarm is associated with the reported physical channel; and
   changing a circuit identification in the ticket if there is no recorded alarm associated with the reported physical channel.

9. The non-transitory computer-readable medium of claim 8, further comprising:
   verifying the network is compatible with the diagnostic test.

10. The non-transitory computer-readable medium of claim 8, further comprising:

determining if a working card and a protection card deployed in a provider edge router of the network are inactive.

11. The non-transitory computer-readable medium of claim 8, wherein the identifying comprises:
running a test script that determines a status of each of the plurality of physical channels; and
running an extended ping test script on each of the plurality of physical channels.

12. The non-transitory computer-readable medium of claim 11, wherein the identifying further comprises:
running a quick monitor test script for each of the plurality of physical channels; and
determining if the problem is associated with more than one of the plurality of physical channels.

13. The non-transitory computer-readable medium of claim 8, wherein the quick monitor test script tests a plurality of predefined test points in the network.

14. An apparatus for automatically diagnosing a problem in a network having a plurality of physical channels, comprising:
a processor configured to:
receive a ticket indicating the problem for a logical channel, wherein the plurality of physical channels is grouped into the logical channel;
identify a physical channel of the plurality of physical channels of the network that is a potential cause of the problem;
run a diagnostic test on the physical channel that is identified;
report a result of the diagnostic test;
compare the physical channel that is identified with a reported physical channel in the ticket;
check for a recorded alarm associated with the reported physical channel in the ticket;
log an alarm if the recorded alarm is associated with the reported physical channel; and
change a circuit identification in the ticket if there is no recorded alarm associated with the reported physical channel.

* * * * *